(12) United States Patent
Shipley

(10) Patent No.: US 8,755,160 B2
(45) Date of Patent: Jun. 17, 2014

(54) MEASURING TRANSIENT ELECTRICAL ACTIVITY IN AIRCRAFT POWER DISTRIBUTION SYSTEMS

(75) Inventor: Adrian Shipley, Cheltenham (GB)

(73) Assignee: GE Aviation Systems Limited (GB)

( * ) Notice: Subject to any disclaimer, the term of this patent is extended or adjusted under 35 U.S.C. 154(b) by 498 days.

(21) Appl. No.: 13/113,454

(22) Filed: May 23, 2011

(65) Prior Publication Data

US 2011/0292555 A1    Dec. 1, 2011

(30) Foreign Application Priority Data

May 26, 2010 (GB) .................................. 1008794.8

(51) Int. Cl.
*H02H 9/00* (2006.01)
(52) U.S. Cl.
USPC ........................................................ 361/91.1
(58) Field of Classification Search
USPC ........................................................ 361/91.1
See application file for complete search history.

(56) References Cited

U.S. PATENT DOCUMENTS

| | | | |
|---|---|---|---|
| 5,513,060 A | 4/1996 | Bremond | |
| 5,822,166 A * | 10/1998 | Massie | 361/111 |
| 7,245,470 B2 * | 7/2007 | Hoopes | 361/91.1 |
| 2005/0219779 A1 | 10/2005 | Kim | |
| 2009/0268364 A1 | 10/2009 | Trautman | |

FOREIGN PATENT DOCUMENTS

CA        2307537 A1    11/2000

OTHER PUBLICATIONS

UK Examination Report from corresponding GB Application No. 1008794.8, dated Aug. 2, 2012.
GB Search Report—Intellectual Property Office—Date of Search : Nov. 3, 2010.

* cited by examiner

*Primary Examiner* — Stephen W Jackson
(74) *Attorney, Agent, or Firm* — Global Patent Operation; Vivek P. Shankam

(57) ABSTRACT

An electrical power distribution system for an aircraft comprises a power source electrically connected to an electrical load and at least one circuit interruption device for interrupting current in the power distribution system. A distinguishing device is connected to the system for distinguishing a transient electrical event in the system from a steady-state level of electrical activity in the system, wherein the transient electrical event induces a potential difference across all or part of the distinguishing device. The circuit interruption device is operable to interrupt current flowing through the power distribution system if the potential difference across the distinguishing device exceeds a threshold voltage.

4 Claims, 2 Drawing Sheets

MEASURING TRANSIENT ELECTRICAL ACTIVITY IN AIRCRAFT POWER DISTRIBUTION SYSTEMS

FIELD OF INVENTION

The present invention relates to electrical power distribution systems for aircraft, and in particular measuring transient electrical activity therein.

BACKGROUND OF THE INVENTION

Aircraft electric power systems and other power distribution systems are exposed to a wide range of disturbances, which may initiate transient electrical events. For example, equipment failure and lightning strikes can lead to current and voltage transients. Short-circuit conditions can also result in transient surges. Such transients may cause electrical arcing in the power distribution system and/or overheating of circuit components, which in turn may present fire hazards.

Against this background, there is a tendency to design aircraft and other electric power systems to operate at higher and higher voltages and hence lower currents, allowing reduction in the weight of the cables of the system. Both DC and AC power systems may be used in aircraft.

In the prior art, transients have traditionally been measured using a current transducer, which in DC systems must interrupt the circuit under measurement in order to be inserted therein. FIG. 1 shows such a prior art system, including a power distribution system 11 having a DC source 12 connected to a load 14. An arc event 15 is measured by a current transducer 13, which is connected in series in the circuit between the load 14 and the power supply 12. The arc produces a back emf in the circuit of approximately 20V, the back emf being substantially independent of the source voltage. As higher source voltages are used, the change in current associated with the arc event becomes increasingly small compared with the overall system current, and therefore the change in current is harder to measure.

An alternative prior art approach involves the measurement of a travelling wave superimposed on the system voltage, brought about by the electrical transient. This method relies on knowledge of a characteristic circuit impedance which is uncontrolled in an electrical installation.

SUMMARY OF THE INVENTION

The present invention provides an electrical power distribution system for an aircraft, comprising a power source electrically connected to an electrical load and at least one circuit interruption device for interrupting current in the power distribution system, further comprising a distinguishing device connected to the system for distinguishing a transient electrical event in the system from a steady-state level of electrical activity in the system, wherein the transient electrical event induces a potential difference across all or part of the distinguishing device, the circuit interruption device being operable to interrupt current flowing through the power distribution system if the potential difference across the distinguishing device exceeds a threshold voltage.

Further, the present invention provides a method of measuring transient electrical activity in an electrical power distribution system for an aircraft comprising connecting a distinguishing device to the power distribution system, the distinguishing device being operable to separate a transient electrical event in the system from a background level of electrical activity in the system, wherein transient electrical activity in the system induces a potential difference across all or part the distinguishing device, monitoring the potential difference induced across all or part of the distinguishing device and operating a circuit interruption device to interrupt current flowing through the system if the potential difference exceeds a threshold voltage.

In steady state D.C. operation of the electrical system, without arcing or any other form of surge occurring, substantially no current flows through the distinguishing device. However, when a surge occurs, the current flowing through the system and hence through the sensor changes relatively rapidly, and the distinguishing device allows current to flow through it. Since it is the change in current whose measurement is enabled by the distinguishing device, the magnitude of the background steady state current/voltage does not hinder the measurement. The present invention advantageously decouples the transient from the steady state current, allowing simple measurement of the transient. Compared to the prior art approach of measuring a travelling wave superimposed on the system voltage, the present invention provides a considerably simpler and cheaper means of measuring a transient.

Various subsidiary features of the invention are set out in the dependent claims. In an advantageous embodiment of the invention, the distinguishing device can comprise at least one resistor connected to at least one capacitor. Using simple circuit components appropriately arranged in the distinguishing device, the device allows the flow of only transient currents in the power distribution system.

BRIEF DESCRIPTION OF THE DRAWINGS

There follows a detailed description of embodiments of the invention by way of example only, with reference to the accompanying drawings, in which.

DETAILED DESCRIPTION OF THE INVENTION

Figure 1:
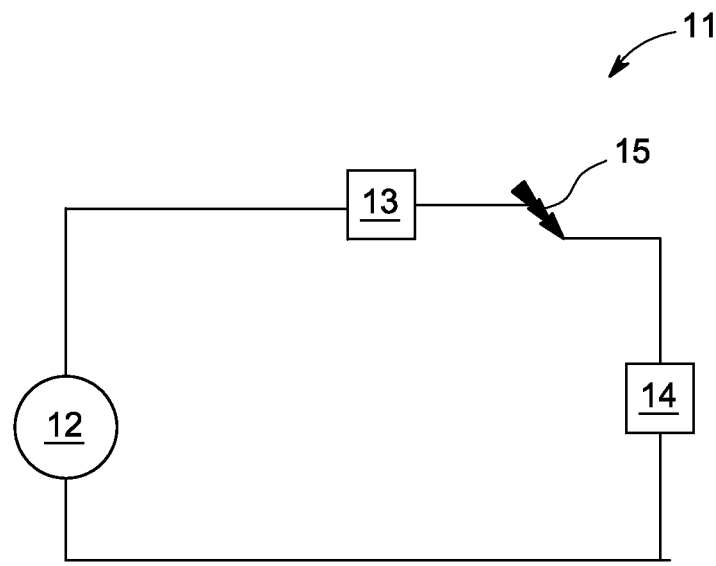
FIG. 1 is a schematic circuit diagram showing a prior art electrical system.

FIG. 1 shows a prior art aircraft power distribution system 11 comprising a power source 12 which may be AC or DC, and a load 14 which can comprise any of the electrical loads of an aircraft, such as flight control systems, or lighting systems for example. An arc 15 is occurring in the power distribution system 11, thereby causing a transient fluctuation in the current flowing through the system. A current transducer 13 is disposed directly in the circuit, in series with the load 14 in order to make a direct measurement of the change in current caused by the arcing event 15.

The operation of the present invention is based on the fact that, during a circuit transient such as an arcing event, an instantaneous voltage transient is imposed into the system. At the instance of the arc event the current must remain constant due to the circuit inductance; this is achieved converting some of the inductive energy ($\frac{1}{2}LI^2$) into voltage, thus neutralizing the transient voltage effect and therefore allowing the circuit current to remain unaltered at the initial instance of the electrical transient. This transient increase in the system voltage can be measured if the measurement is taken with respect to the total system voltage or some invariant system neutral voltage.

Figure 2:
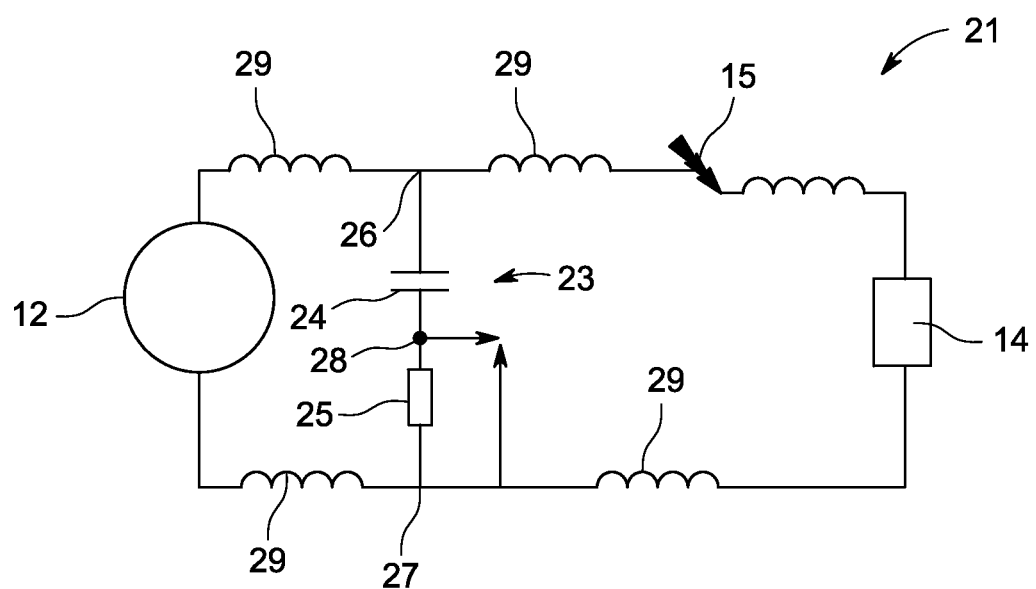
FIGS. 2 to 4 are schematic circuit diagrams respectively showing embodiments of the invention.

FIG. 2 shows a first embodiment of the invention, wherein an aircraft electrical power distribution system 21 is shown schematically. The power source 12 is a DC source in this embodiment.

It can be seen that there is lumped circuit inductance 29 distributed throughout the circuit, connecting the source 12 to the load 14. Should an arc event 15 occur, a voltage is instantiated across the arc itself. This voltage transient would have the effect of reducing the load voltage and thus load current, however, due to the circuit inductance the instantaneous current is not allowed to reduce. The circuit inductance causes an increase in the system voltage to compensate for the arc voltage transient. A distinguishing device 23, also referred to herein as a sensor 23, is connected to the system 21 at connection points 26 and 27. The distinguishing device 23 allows transient electrical activity to be distinguished from steady-state electrical activity. The device 23 forms a parallel circuit section connected to the poles of the power source 12.

The distinguishing device 23 comprises a capacitor 24 and a resistor 25, and under normal conditions, the capacitor current is zero and in the fully charged state of the capacitor the voltage across the resistor 25 is also zero. The capacitor 24 and the resistor 25 are connected in series.

Under a transient condition, the voltage across the sensor 23 is raised due to the compensating inductive energy of the circuit; however, the voltage across the capacitor cannot change instantly, due to the resistance 25 being in series with it. Therefore, the voltage transient appears across the resistor 25 which in turn can be measured. The voltage is measured across the points 27 and 28 as shown in FIG. 2.

Figure 3:
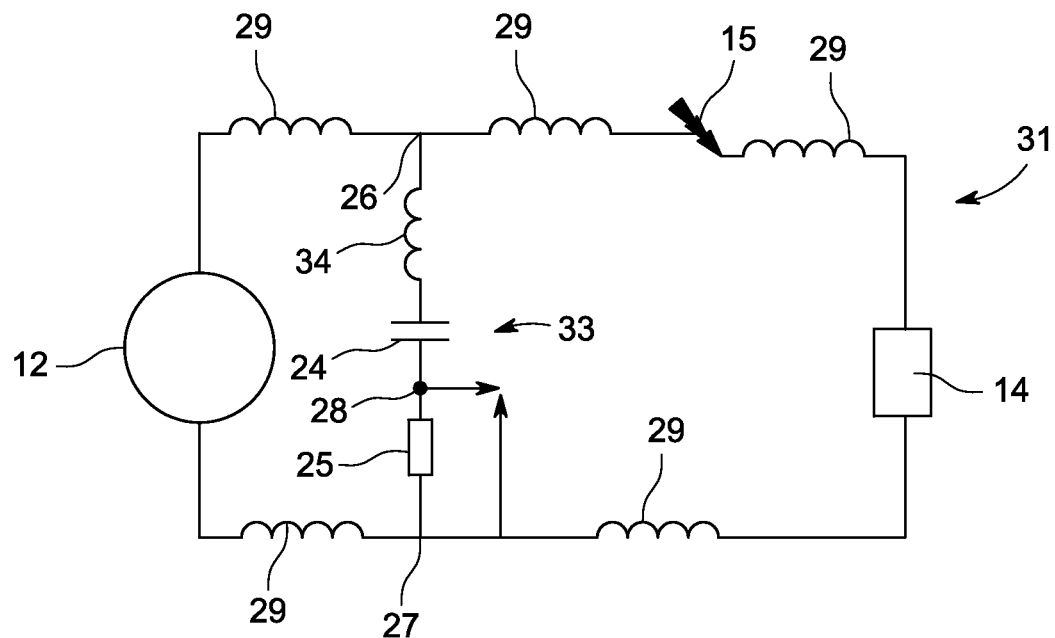

FIG. 3 shows another embodiment of the invention, wherein the distinguishing device or sensor 33 includes an inductor 34 as well as the capacitor 24 and the resistor 25 of the first embodiment. Thus the sensor 33 comprises a resonant circuit, which resonates for a time proportional to the arcing transient. The inductor 34, the capacitor 24 and the resistor 25 are connected in series, but various configurations of these components can be used. In this embodiment, the power source 12 can be an AC or DC source. Where a DC source is used, no current flows through the sensor 33 in the steady state operation of the power distribution system 31.

Figure 4:
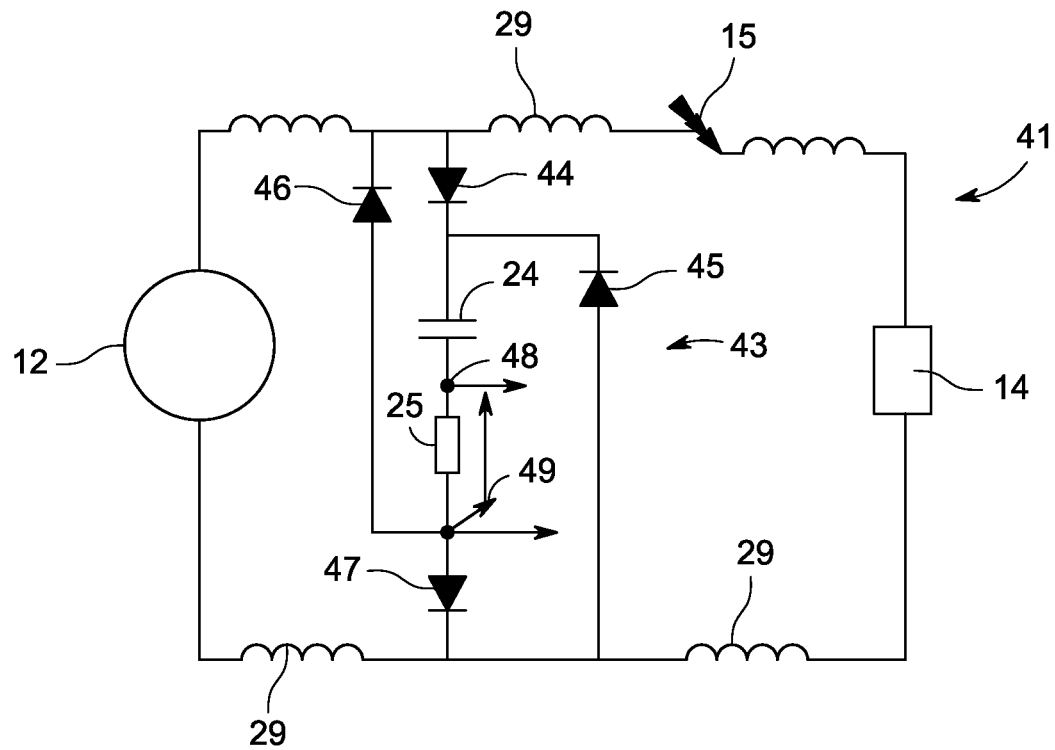

FIG. 4 shows a further embodiment of the invention, particularly suited to AC power sources, wherein the distinguishing device/sensor 43 includes a capacitor 24 and a resistor 25, which are again connected in series. The sensor 43 includes a diode bridge comprising first, second, third and fourth diodes 44 to 47 to rectify the AC signal across the sensor 43. Thereby, in steady state AC operation of the system, the diode bridge 44, 45, 46 and 47 substantially restricts the flow of the steady state AC current along the distinguishing device 43, but allows a transient surge to be transmitted along the distinguishing device 43 and measured across the resistor 25. The sensor reading is taken by measuring the potential difference between the points 48 and 49 in FIG. 4.

In each of the embodiments, the voltage measured across the resistor 25 is low or substantially zero in steady state operation of the power distribution system. When an electrical transient occurs anywhere in the system, the power surge causes a potential difference to arise across the resistor 25, which is measured using a voltmeter. If the voltage across the resistor exceeds a threshold value, action can be taken to prevent damage to the power distribution system. For example, a circuit breaker in the system can be tripped to cease current flow.

The distinguishing device 23, 33, 43 of the present invention can be retrofitted to existing power distribution systems.

What is claimed is:

1. An electrical power distribution system for an aircraft, comprising:
    a power source electrically connected to an electrical load and at least one circuit interruption device for interrupting current in the power distribution system; and
    a distinguishing device connected to the system for distinguishing a transient electrical event in the system from a steady-state level of electrical activity in the system,
    wherein the transient electrical event induces a potential difference across all or part of the distinguishing device, the circuit interruption device being operable to interrupt current flowing through the power distribution system if the potential difference across the distinguishing device exceeds a threshold voltage,
    wherein the distinguishing device comprises at least one resistor connected in series to at least one capacitor, and at least one inductor or diode connected in series with the at least one resistor and capacitor,
    wherein the distinguishing device is connected in parallel with the power source and the load, and voltage is measured across points on either side of the at least one resistor.

2. A system according to claim 1, wherein the power source comprises an AC source and the distinguishing device comprises a diode bridge for filtering an AC current.

3. A method of measuring transient electrical activity in an electrical power distribution system for an aircraft, the method comprising:
    connecting a distinguishing device to the power distribution system, the distinguishing device being operable to separate a transient electrical event in the system from a background level of electrical activity in the system, wherein transient electrical activity in the system induces a potential difference across all or part the distinguishing device;
    monitoring the potential difference induced across all or part of the distinguishing device; and
    operating a circuit interruption device to interrupt current flowing through the system if the potential difference exceeds a threshold voltage, wherein the distinguishing device comprises at least one resistor connected in series to at least one capacitor, and at least one inductor or diode connected in series with the at least one resistor and capacitor,
    wherein the distinguishing device is connected in parallel with a power source and load in the power distribution system, and voltage is measured across points on either side of the at least one resistor.

4. A distinguishing device for connection to an aircraft power distribution system, the distinguishing device being operable to distinguish a transient electrical event in the system from a background level of electrical activity in the system, wherein the transient electrical event induces a potential difference across all or part of the distinguishing device, wherein the distinguishing device comprises at least one resistor connected in series to at least one capacitor, and at least one inductor or diode connected in series with the at least one resistor and capacitor, wherein the distinguishing device is connected in parallel with a power source and load in the power distribution system, and voltage is measured across points on either side of the at least one resistor.

* * * * *